Sept. 17, 1946.   S. R. CAIN   2,407,812
MEANS FOR THE REMOTE CONTROL OF FLUID PRESSURE ACTUATED APPARATUS
Filed May 10, 1944   2 Sheets-Sheet 1
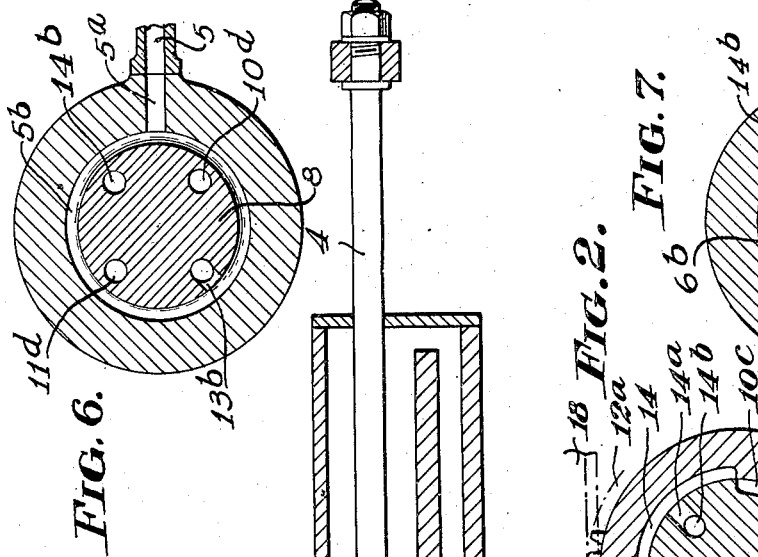
INVENTOR
SIDNEY R CAIN Sept. 17, 1946.  S. R. CAIN  2,407,812
MEANS FOR THE REMOTE CONTROL OF FLUID PRESSURE ACTUATED APPARATUS
Filed May 10, 1944  2 Sheets-Sheet 2
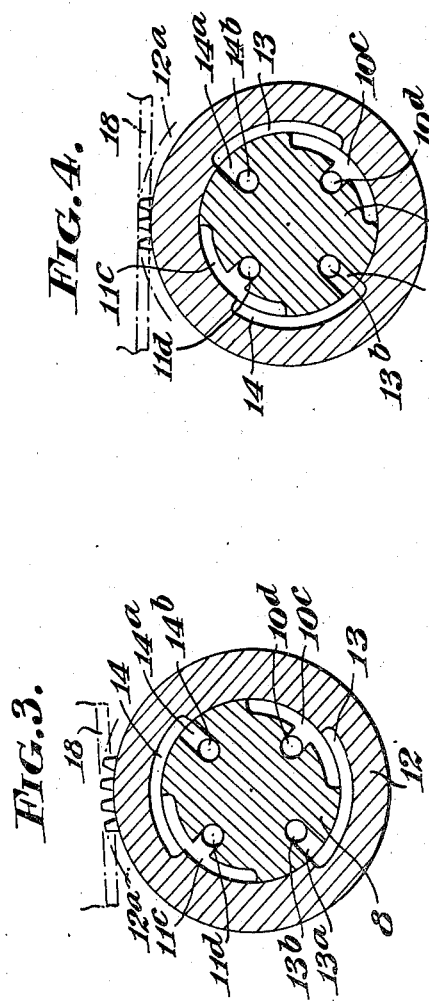
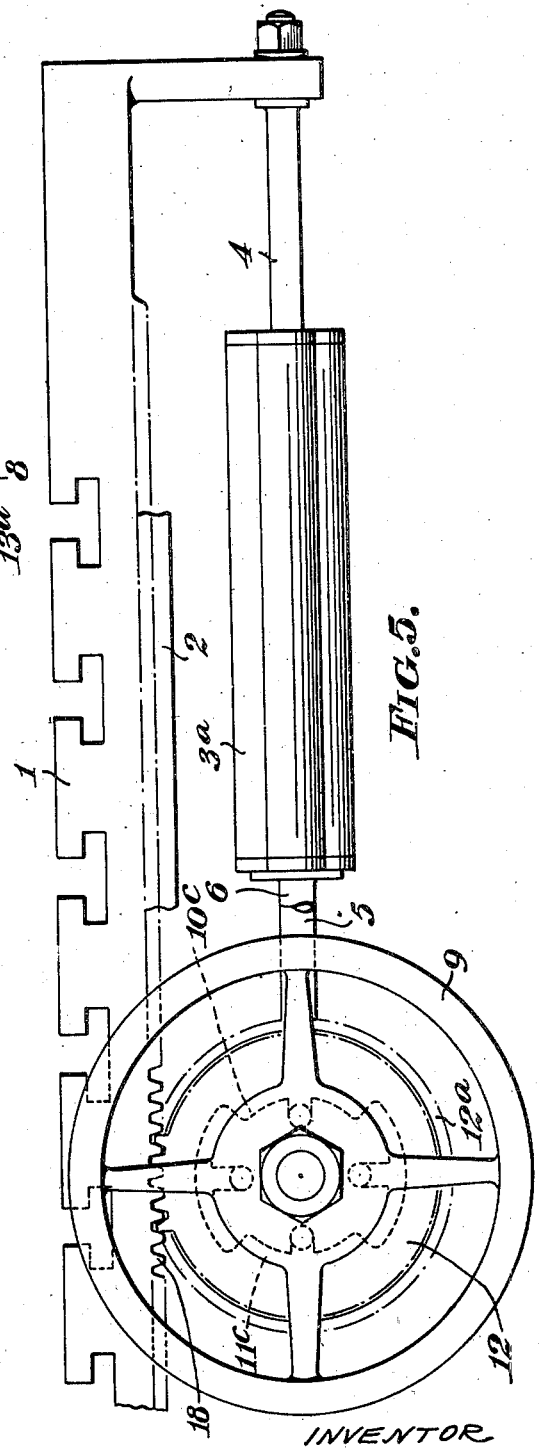
INVENTOR
SIDNEY R. CAIN Patented Sept. 17, 1946

2,407,812

UNITED STATES PATENT OFFICE 2,407,812

MEANS FOR THE REMOTE CONTROL OF FLUID PRESSURE ACTUATED APPARATUS

Sidney Richard Cain, Henley-on-Thames, England

Application May 10, 1944, Serial No. 534,972
In Great Britain April 30, 1943

3 Claims. (Cl. 121—41)

This invention relates to means for the remote control of the movements of apparatus adapted to be moved by fluid pressure. For example, the invention relates to the controlling of the movements of benches, lifting tackle, armament mountings, steering wheels and multitudinous other apparatus which can be adjusted translatively or angularly by being connected to a fluid pressure driven member. The object of this invention is to enable an operator to have complete control over the movements of the apparatus by means of an easily operated manually driven control device in such manner that movements applied manually to the control device are translated into simultaneous movements of the fluid pressure driven apparatus which vary in direction and stop and continue in accordance with corresponding operations of the control device, whereby a wide range of adjustment is permitted.

According to the invention, remote control means for controlling the movements of an apparatus driven, or adjustable translatively, by fluid pressure comprises a manually operated distributor adapted to be interposed between the supply source of the pressure fluid and the driven apparatus, said distributor incorporating cooperating ported elements, one of which is manually operated and the other of which is power driven in synchronism with the driven apparatus, the arrangement being such that movement of the driven apparatus is maintained by moving the manually driven ported element to maintain a predetermined port alignment with the power driven element and that movement of the driven apparatus is arrested by arresting movement of the manually driven ported element to break such alignment, selection or change in direction of movement of the driven apparatus being effected by appropriate selection of alignment of ports provided in the co-operating elements, such latter selection depending upon the direction of the movement imparted to the manually operated ported element.

In carrying one form of the invention into practice the apparatus to be driven can be a slidable bench, oscillatable mounting for a gun or guns, observatory telescope, steering gear or any other appropriate mass adaptable for actuation from a fluid pressure driven unit. The driving means can be a hydraulic ram the piston of which is connected to the apparatus to be moved by any suitable mechanical means, and the cylinder connected at opposite ends to the source of supply of pressure fluid via a rotary distributor, the rotary element of which is operated from a handwheel and is ported to co-operate with a fixed ported housing for changing the direction of flow of the pressure fluid to and from the cylinder. In addition to this fixed ported housing there is provided an annular member disposed about the said manually operated ported element and also ported to co-operate with the manually operated ported element, such annular member being operatively connected to the driven apparatus so that it rotates in unison with the movement of the driven apparatus, the arrangement being that in order to maintain supply of pressure fluid to the cylinder the operator must rotate the manually operated element to maintain alignment of a port therein with a port in the annular member.

In order that the invention may be clearly understood and readily carried into effect, drawings are appended hereto illustrating embodiments thereof, and wherein:

Figure 1 is a somewhat diagrammatic sectional plan view showing the invention applied to the control of the movement of a machine tool table or a bench.

Figures 2, 3 and 4 are sections on the line 2—2 of Figure 1, showing normal or idle and the alternative operational setting positions of the distributor.

Figure 5 is a front elevation view of Figure 1.

Figure 6 is a section on the line 6—6 of Figure 1.

Figure 7 is a section on the line 7—7 of Figure 1.

Referring to the drawings, the mass to be moved is represented diagrammatically as a tool table or bench 1 mounted to slide on guides 2. The table 1 is driven along the guides 2 by a hydraulic ram 3, the piston rod 4 of which is connected to the table 1. The ends of the cylinder 3a of the ram have connected to them conduits 5 and 6 for the supply and exhaust of pressure fluid, and these conduits are connected to ports 5a and 6a respectively in a fixed housing 7 of a rotary manually operated distributor, the rotary manually operated element of which is a ported cylindrical body 8 to which is fitted a handwheel 9.

The supply and return conduits leading directly to the source of supply of pressure fluid are indicated by the reference numerals 10 and 11 respectively and are connected to ports 10a and 11a in the housing 7. The rotary body 8 communicates with these ports 10a and 11a by two circumferential channels 10b and 11b respectively and these circumferential channels are in constant communication with two segmental ports 10c and 11c by passages 10d and 11d respectively bored through the body 8 parallel with its axis. The part of the body 8 containing the two segmental ports 10c and 11c is located outside the housing 7 and is encircled by an annular ported collar 12 which is formed internally with a diametrically opposed pair of segmental ports 13 and 14 normally covered by the circumference of the body 8 between the ports 10c and 11c so that the pressure fluid passing into the passage 10d cannot pass beyond the ported body 8.

Midway between the ends of the ports 10c and 11c, that is, alternating therewith, are two radial ports 13a and 14a, see Figure 2, which are in constant communication with the segmental ports 13 and 14 respectively in the collar 12, and these radial ports 13a and 14a form the outer termini of two passages 13b and 14b bored through the ported body 8 parallel with its axis. The passages 13b and 14b lead into radial passage extensions 13c and 14c which terminate into two circumferential channels 5b and 6b respectively communicating constantly with the beforesaid radial ports 5a and 6a receiving the conduits 5 and 6.

The ported collar 12 is free to rotate upon the cylindrical ported body 8 and sealing rings 15 ensure a fluid-tight seal between the collar 12 and the body 8. Also a packing ring or gland 16 can be interposed between the collar 12 and the fixed housing 7, a coiled compression spring 17 or other suitable axial pressure-applying means being interposed between the outer annular face of the collar 12 and the handwheel 9.

The collar 12 has a circumferential gear ring 12a in constant mesh with a rack bar 18 which moves in unison with the table 1, with the result that in order to commence and maintain movement of the table the ported body 8 must, by its handwheel 9, be rotated to connect either port 10c or 11c with the appropriate port 13 or 14 to bring the ram cylinder into circuit and for such ported body to be rotated by hand at the same speed as the collar 12 to maintain the supply of pressure fluid to the ram cylinder. It will be appreciated that according to the direction of rotation imparted to the ported body 8, so will the operator determine which of the conduits 5 and 6 is connected to the supply of pressure fluid and which acts as exhaust conduit with a consequent determination of the direction of movement of the table or its equivalent.

By referring to the normal and the alternative positions of the ported body 8 shown in Figs. 2, 3 and 4, it will be seen that if the handwheel 9 is turned clockwise from the position of Fig. 2 to that shown in Fig. 3, the pressure fluid will flow from conduit 10 along passage 10d to segmental port 10c and thence to the conduit 5 via ports 13 and 13a and passage 13b. This will result in the ram being driven to the right and carrying with it the table 1, which in turn drives the collar 12 in the clockwise direction, such movement being maintained so long as the operator, by appropriate manipulation of handwheel 9, maintains the said communication between the appropriate ports. The exhaust fluid will be returned to the conduit 11 by the conduit 6, passage 14b, radial port 14a, segmental ports 14 and 11c and passage 11d and circumferential channel 11b.

If the handwheel 9 is held against rotation the collar 12 will continue to be moved by the table through the small angle required to break connection between the segmental ports 10c, 11c and 13, 14 respectively and consequently further movement of the ram and table is arrested.

By reversing the direction of rotation of the handwheel 9, that is, into an anti-clockwise direction, as shown in Figure 4, the conduit 5, port 10c, passage 13b, ports 13a, 13 and 11c and passage 11d now become part of the exhaust or return circuit, and the conduit 6, passage 14b, ports 14a, 14 and 10c and passage 10d become part of the pressure supply circuit.

Instead of a reciprocating type of pressure fluid power unit such as a ram, a rotary pressure fluid driven motor may be employed, geared to a rotary driven apparatus as distinct from the reciprocating table, for example for the remote control of a gun turret, the rotary driven apparatus driving the collar 12. When it is required to control a rotary driven apparatus in two dimensions, for example a gun for direction and elevation, one rotary pressure fluid driven motor may drive a planet gear wheel to traverse a toothed annulus under control of a handwheel distributor as already described for varying the direction of the gun, and the gun trunnions may be oscillated by another pressure fluid driven motor, likewise controlled by another distributor, the two distributors being combined as a unitary assembly, the handwheel actuating one ported body 8 directly and the housing 7 of such ported body being fixed or geared to the ported body of the other distributor, such housing 7 being used as a lever for actuating the latter ported body, rotation of the handwheel adjusting the gun for direction and oscillation of the housing 7 which acts as a lever adjusting the gun for elevation. If desired, registration marks, or a pointer and a mark, can be formed on the handwheel 9 and collar 12 to assist the operator to rotate the handwheel at the same speed as the collar 12.

The invention may also be used as a means for remotely controlling a steering gear, either as an alternative, or as an addition to the known worm and nut or other steering gears.

I claim:

1. In a machine of the character described, a movable member, a fluid motor for operating said member including a cylinder and piston, a manually operated distributor adapted to be interposed between a source of fluid pressure supply and the said movable member, said distributor having a housing, a set of ports comprising an inlet port connected to the source of supply and an exhaust port, a second set of ports in said housing connected to the cylinder of said fluid motor to thereby provide for moving said piston, said piston having a piston rod connected outside the said cylinder to said movable member, power imparting means carried by an end of said movable member, an inner and an outer ported element forming cooperating ported elements one of which is manually operated and the other of which is power driven by said power imparting means in synchronism with the movable member, all of the ports in the said distributor housing communicating with a corresponding number of ports in the periphery of the inner ported element, said latter ports all contained in a common plane normal to the axis of the inner element and all being surrounded by the outer ported element, the latter ported element having a pair of diametrically opposed ports extending around the circumference of the inner ported element so that in the idle setting of the distributor the ports in the outer element communicate with the ports in the periphery of the inner element communicating with only one of the said sets of ports in the housing, but adapted to move into communication with the other ports in the inner element immediately when rotation is imparted to one ported element relatively to the other, whereby movement of said movable member is maintained by moving said manually operated member to a selected predetermined port alignment with the said set of ports connected to the fluid motor for driving said piston and movable member to impart movement to said power driven ported element, until movement of said manually driven ported element is arrested and breaks said port alignment and stops movement of said movable member by the final movement of the piston.

2. In a machine according to claim 1, wherein said manually operated ported element is a cylindrical body rotatable in the said distributor housing and said other ported element is an annular body connected to said power imparting means carried by the said movable member and automatically driven thereby, said annular body being fitted about said manually operated cylindrical body close to an end of said housing, a pair of circumferential channels in said manually operated cylindrical body permanently communicating with said first-mentioned set of ports in the housing connected to the source of fluid pressure supply, a pair of passages in the said cylindrical body separately connecting said channels to a pair of ports in the periphery of said cylindrical body, a further pair of ports in said cylindrical body alternating with the beforesaid pair of ports and connected by passages in the body to a second pair of circumferential channels in the body, said second pair of channels communicating permanently with said second set of ports in said housing connected to the cylinder of said fluid motor, conduits connected to each port of said set leading to opposite ends of the cylinder and adapted to supply fluid to drive said piston and the said movable member, and a pair of ports in said annular driven member, each adapted to span a selected pair of ports in the manually operated element for effectively connecting the fluid motor to the source of fluid pressure supply and to break the connection by each being moved away from one of the said ports when said manually operated member's movement is arrested.

3. In a machine of the character described, a movable member, a hydraulic ram with a piston rod connected to an end of said member, said ram including a cylinder and a piston, supply and exhaust conduits connected to said cylinder, a distributor having a housing, a set of ports adapted to align with said conduits, a pair of circumferential channels in constant communication with said ports, a cylindrical body rotatably mounted in said housing, manually operated means adapted to rotate the said body, a second set of ports in said housing, supply and exhaust conduits connected to said second set of ports and to a source of fluid pressure, a pair of circumferential channels communicating with said second set of ports, said channels being in constant communication with segmental ports, said segmental ports being connected to said circumferential channels by passages in said body extending parallel with the axis of said body, said rotatable body extending beyond said housing to thereby expose said segmental ports, an annular collar having defined in the bore thereof a diametrically opposed pair of segmental ports normally covered by the circumference of said body between the said segmental ports therein, whereby fluid passing into one of said axial channels cannot pass from said body, a pair of radial ports midway between said segmental ports of said body adapted to be in constant communication with said segmental ports in said collar, said radial ports forming the outer termini of another pair of passages bored in said body parallel to the axis thereof, said last-named axial passages each leading into radial passage extensions connected to said first-mentioned circumferential channels connected to said first set of ports, a ring gear on the circumference of said collar, and a rack bar carried by said movable member in constant mesh therewith, whereby manual rotation of said body to connect one of said segmental ports with its related segmental port in the collar closes the fluid circuit to said ram, to thereby move said movable member until said rotation of the body is manually arrested and said collar thereby has movement to break said circuit and arrest movement of the movable member.

SIDNEY RICHARD CAIN.